No. 842,588. PATENTED JAN. 29, 1907.
D. M. SOMERS.
STEAM ENGINE SYSTEM.
APPLICATION FILED MAR. 3, 1900.

Attest:
J. A. Travis
A. V. Bourke

Inventor
Daniel M. Somers
By Philipp, Philipp & Sanger
Attys

No. 842,588. PATENTED JAN. 29, 1907.
D. M. SOMERS.
STEAM ENGINE SYSTEM.
APPLICATION FILED MAR. 3, 1900.

No. 842,588. PATENTED JAN. 29, 1907.
D. M. SOMERS.
STEAM ENGINE SYSTEM.
APPLICATION FILED MAR. 3, 1900.

No. 842,588. PATENTED JAN. 29, 1907.
D. M. SOMERS.
STEAM ENGINE SYSTEM.
APPLICATION FILED MAR. 3, 1900.

UNITED STATES PATENT OFFICE.

DANIEL M. SOMERS, OF NEW YORK, N. Y.

STEAM-ENGINE SYSTEM.

No. 842,588.   Specification of Letters Patent.   Patented Jan. 29, 1907.

Application filed March 3, 1900. Serial No. 7,200.

*To all whom it may concern:*

Be it known that I, DANIEL M. SOMERS, a citizen of the United States, residing at borough of Brooklyn, city of New York, county of Kings, and State of New York, have invented certain new and useful Improvements in Steam-Engine Systems, fully described and represented in the following specification and the accompanying drawings, forming a part of the same.

The chief object of the present invention is to avoid the difficulties heretofore existing in steam-engine systems that use the water condensed from the exhaust-steam or condense-water as a part of the boiler feed-water resulting from such steam and condense-water containing lubricating-oil, especially for the lubrication of the steam-cylinders, which oil is liable to cause great damage on account of its deposition and hardening on the heating-surfaces of the boiler and the consequent waste of heat and danger of burning out the boiler tubes or sheets. These difficulties have long been recognized, and many efforts have been made to avoid them, such efforts being directed especially to the removal of the oil from the condense-water before its admission to the boiler-feed water or before reaching the boilers. These efforts, however, have been only partially successful, and the use of condense-water as any considerable proportion of the whole amount of feed-water is not secured only at large expense and constant watchfulness and attended by the danger of inefficient removal of the oil and consequent injury to the boilers.

The present invention largely avoids the difficulties above referred to in the use of condensed water as a part of the feed-water by providing efficient means for using water or other non-oily liquid for lubricating steam-cylinders, so that this largest source of oil in the exhaust-steam and water condensed therefrom is entirely removed, while a perfect lubrication of the steam-cylinders is secured.

While water or similar non-oily fluid may be used under all circumstances in lubricating steam-cylinders in accordance with my invention, it may be found desirable to use some oil in the lubricating liquid in starting new engines and until the engine reaches its normal running condition, which, as is well known, is not reached until the engine has been run for more or less time, depending upon the character of the construction and fitting of the parts. I have provided therefore a steam-engine system in which provision is made for the use of oil for lubricating the steam cylinder or cylinders, as required, and in which my improved means for applying the lubricating liquid in the cylinder under proper pressure may be used with more or less oil in the water or other lubricating liquid as long as desired and then the lubricating liquid be changed and the system be used with water as the lubricating liquid, which water may be taken from the hot-well or other suitable supply.

With my improved means for applying the liquid for lubricating the steam-cylinder also the oil is not vaporized in the steam-cylinder as in the methods now in use for applying oil for lubricating the cylinder, but substantially all the oil remains in the lubricating liquid and circulates in the lubricating system and does not pass into the boiler feed-water. I am thus enabled to use oil or oily liquid for cylinder lubrication and secure many advantages in the system over other methods of cylinder lubrication, and while I preferably use water for the lubricating liquid on the normal running of the engine the use of my improved system of cylinder lubrication with any liquid or emulsion desired is within the invention, considered broadly. Moreover, in the present methods of using oil for lubrication great waste of oil results, so that a large quantity of oil must be used, while with my improved means of applying lubricating liquid all the oil used is applied properly, so that only a very small quantity need ever be used.

In connection with providing means for the efficient application of liquid for lubricating steam-cylinders I have made also certain improvements in piston construction and means for applying liquid under pressure by which the required piston-ring pressure is secured by the pressure of the liquid, thus providing a uniform pressure, which may readily be gaged and accurately adjusted in place of the objectionable spring-pressure heretofore used.

The invention therefore includes an improved steam-cylinder-lubricating system and means for the efficient application of a liquid for cylinder lubrication and certain features of construction and combinations of parts in steam-engine and steam-piston constructions, all as fully described hereinafter and particularly pointed out in the claims.

For a full understanding of the invention a detailed description of constructions embodying all the features of the same in some of the preferred forms will now be given in connection with the accompanying drawings, forming a part of this specification, and in which—

Fig. 6ª is a face view of a portion of Fig. 6, showing the joint between the piston-ring sections and keepers. Figs. 17 to 21 show a modified lubricating liquid-supply construction.

Referring now especially to the construction shown in Figs. 1 to 16, the engine system illustrated is one having a single main or working engine, from which the exhaust-steam passes through a heater, which is shown as of the form generally known as a "Berriman" heater, either to a steam-heating system or directly to a surface condenser, and the water of condensation from either the steam-heating system or the surface condenser passes thence to the hot-well, from which a boiler feed-pump delivers the feed-water through the Berriman heater to the boilers, and the exhaust-steam from the boiler feed-pump and from other auxiliary engines, if used, passes with the exhaust from the main steam-engine to the heater, such systems being now in common use and being selected for illustration as well adapted for the embodiment of the present invention, although it will be understood that the features forming my invention may be applied to a steam-engine system of any character.

Figure 1:
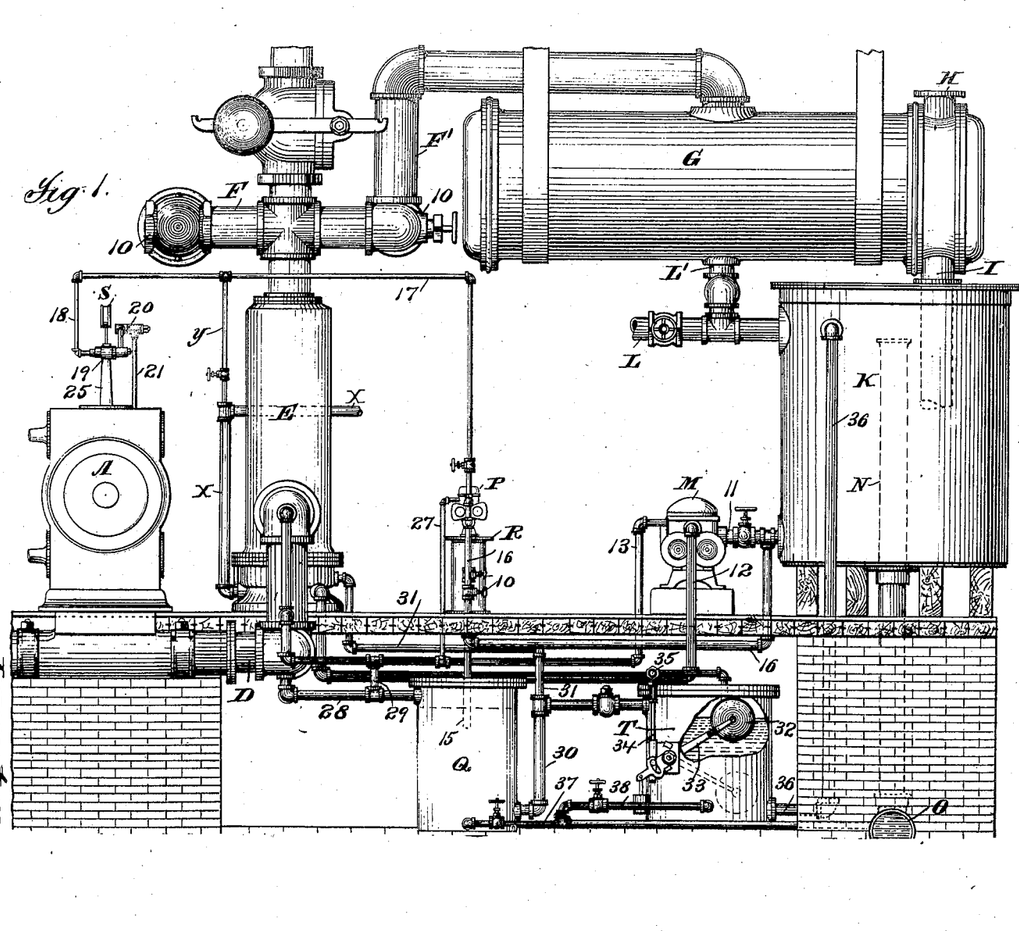
Figure 1 is a diagrammatic elevation of so much of a modern steam-engine system as is necessary to illustrate the present invention.

In the system shown, A is the main engine, having the piston B and piston-rod C and from which the exhaust-steam passes by exhaust-pipe D to the Berriman heater E and thence either to the steam-heating system through pipe F, controlled by valve 10, or through pipe F', controlled by valve 10, to surface condenser G, where the steam is condensed by the condensing water admitted through pipe H and delivered from the condenser through pipe I, and the condense-water or water of condensation from the heating system or from the surface condenser G passes to the hot-well K through pipe L from the heating system or pipe L' from the surface condenser. The boiler feed-water is taken from the hot-well K through pipe 11, which is the suction-pipe of the boiler feed-pump M, and delivered by the pump through force-pipe 12 into the bottom of the Berriman heater E and through the heater to the boilers through pipe X, (the boilers not being shown,) and the exhaust-steam from the boiler feed-pump M passes through exhaust-pipe 13 to the main exhaust-pipe D, so that the exhaust-steam from the boiler feed-pump is delivered to the heater with the steam from the main engine. The hot-well K is provided with an overflow-pipe N, communicating with the sewer-pipe O, as usual in such systems.

Referring now to the novel parts of the system shown, by which the present invention is applied to the general system, the lubricating and balancing liquid is forced under the desired pressure through the steam piston-rod C and the piston B by a small pump P, (shown in Fig. 2 as mounted on the engine-cradle,) the suction-pipe 14 of which pump connects with the tank Q through pipe 15 or readily be secured by the action of pump P and the adjustment of the relief-valve 23. I thus provide for a uniform piston-ring pressure which is gaged by gage S and may be adjusted accurately, so as to secure just the pressure desired and wholly avoid the serious objections to constructions in which the piston-ring pressure is secured by springs, in which the pressure is not uniform, and there is always liability to leakage on account of too little pressure or cutting the cylinder in case of too much pressure.

Figures 5, 6, 7, 8, 9:
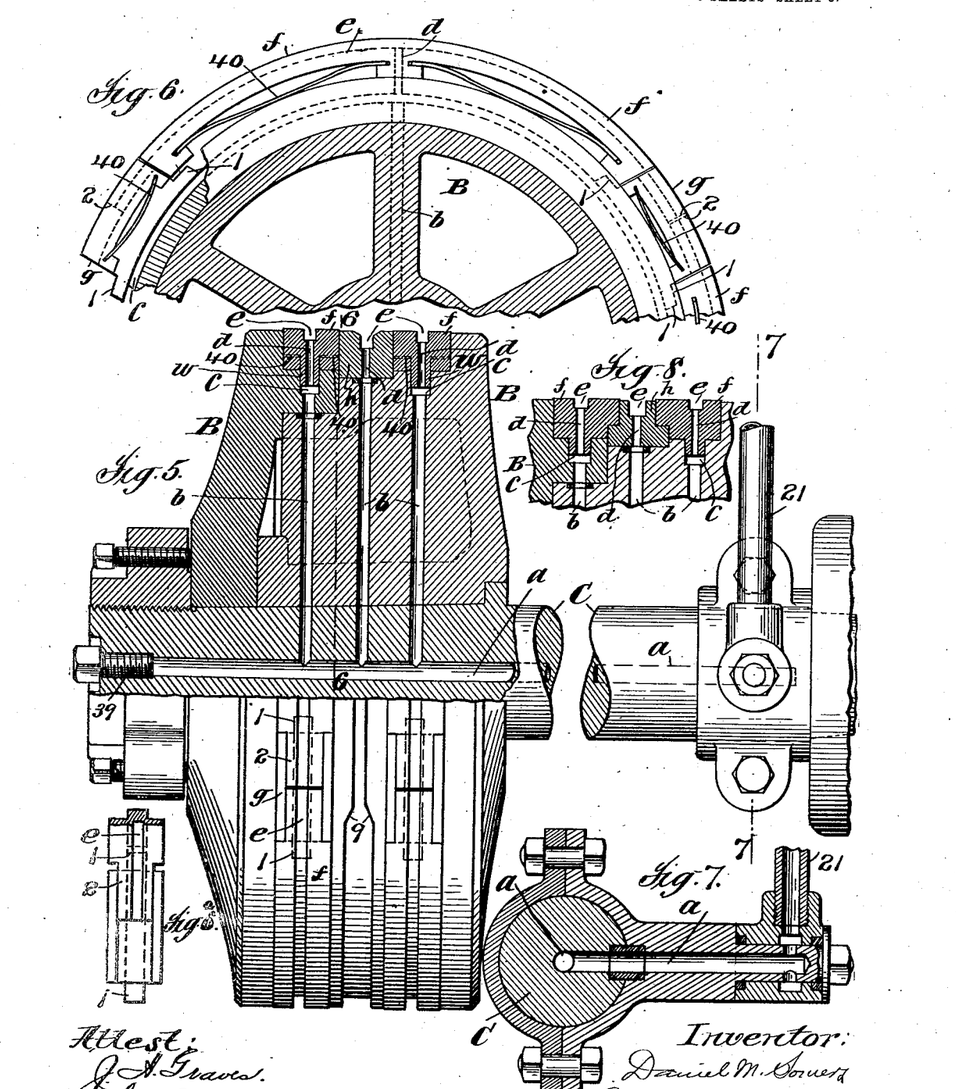
Fig. 5 is a detail view, on an enlarged scale, of the steam-piston of the main engine, the lower part of the view being in side elevation and the upper in central section.
Fig. 6 is a cross-section on the line 6 of Fig. 5, with the piston-rod broken away to shorten the view.
Fig. 7 is a section on the line 7 of Fig. 5.
Fig. 8 is a detail view similar to the upper part of Fig. 5, but showing a modified construction.
Fig. 9 is a side view of the boiler feed-pump with the steam and water cylinders in central section to show the construction.
Figures 9, 15, 16:
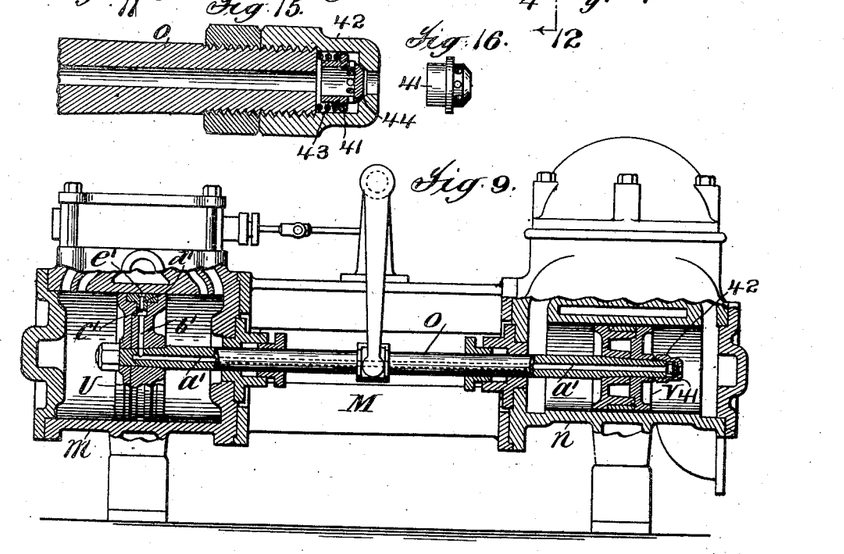
Fig. 15 is a central detail section of the end of the plunger-rod of the feed-pump.
Fig. 16 is a detail view of the valve of Fig. 15.
Figures 10, 11, 12, 13, 14:
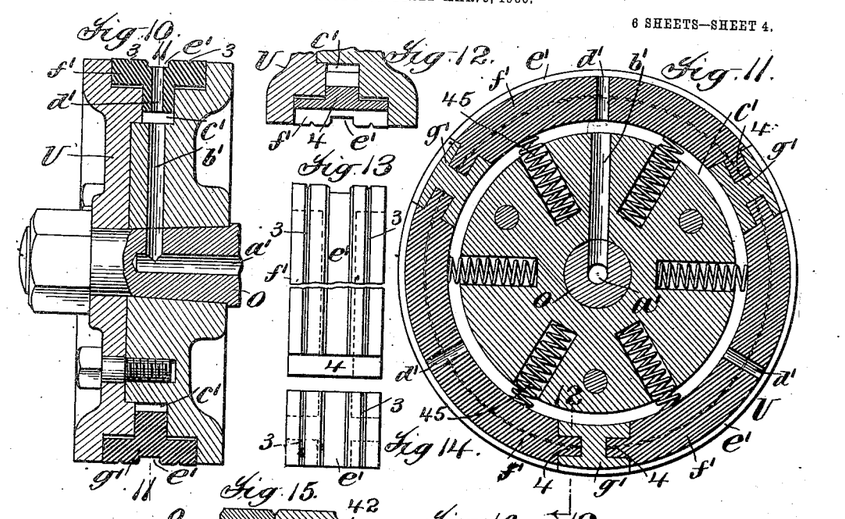
Fig. 10 is an enlarged central section of the steam-piston of Fig. 9.
Fig. 11 is a cross-section of the same on the line 11 of Fig. 10, with the keeper removed.
Fig. 12 is a section on the line 12 of Fig. 11.
Fig. 13 is a face view of one of the piston-sections.
Fig. 14 is a similar view of one of the keepers.
Figures 17, 18, 19:
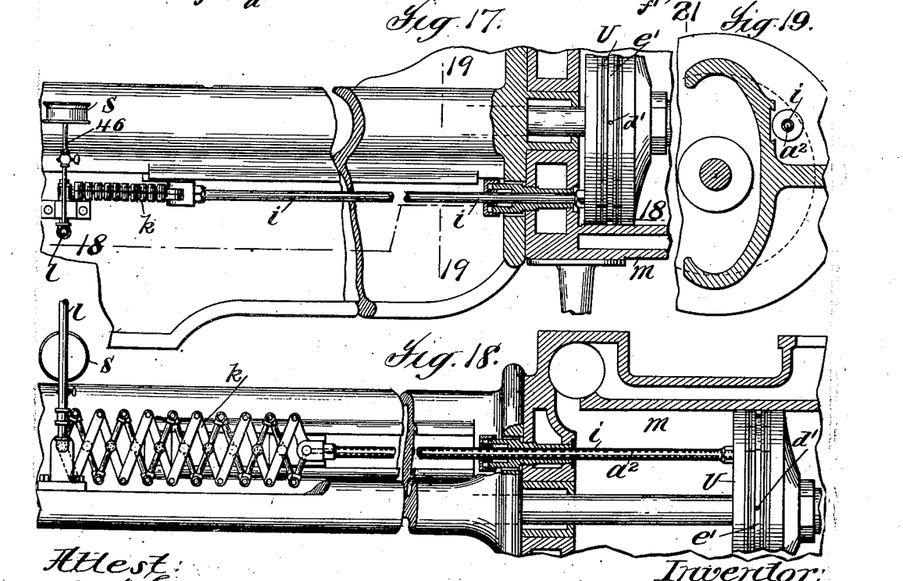
Fig. 17 shows a portion of the steam-cylinder and cradle of the engine, with the cradle in plan and the cylinder in horizontal section.
Fig. 18 is a side view of the same with the piston in a different position.
Fig. 19 is a cross-section on the line 19 of Fig. 17.
Figure 20:
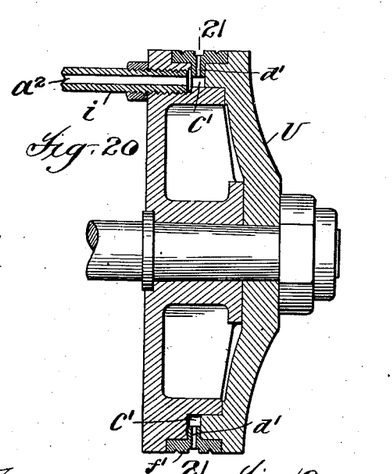
Fig. 20 is a central section through the piston and liquid-supply pipe of Figs. 17 to 19.
Figure 21:
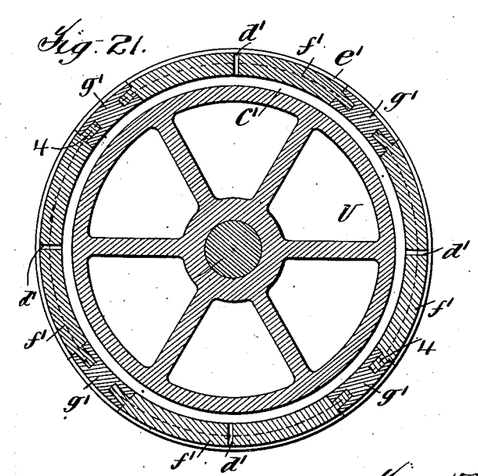
Fig. 21 is a cross-section on the line 21 of Fig. 20.

As shown in Figs. 5 and 6, the two expansible piston-rings carrying the liquid-grooves $e$ are formed of sections $f$ of considerable length and smaller sections or keepers $g$, by which the sections $f$ are kept in position and the ring completed. Each of these sections and keepers has an inwardly-extending rib $w$, which ribs fit closely in annular grooves in the piston, forming the chambers $c$, so that these ribs $w$ form the outer walls of the chambers. These sections and keepers $f$ $g$ are shown as pressed outwardly by flat springs 40, which are divided or consist of two springs on opposite sides of the ribs $w$, so as to secure an even outward pressure on both edges of the rings. These springs 40 may be omitted, however, and are used not for the purpose of securing the desired outward pressure upon the piston-rings for the piston action, as this pressure is secured by the liquid, but for the purpose of holding the sections and keepers in position under a light pressure when the liquid-pressure is not on. The steam may be allowed to blow through between the piston and cylinder in starting, to clean the surfaces, by using only the spring-pressure and then applying the liquid-pressure by pump P.

It is necessary that tight joints be formed by the sections and keepers so as to prevent liquid passing from the chambers $c$ or from the grooves $e$, so as to exert outward or inward pressure on the rings in such a way as to affect the relations of pressure upon the inner and outer sides of the rings, as determined by the relative width of the chambers $c$ and grooves $e$, and for this purpose the following construction is shown in Figs. 5 and 6. Each of the keepers $g$ is provided at opposite ends with a heel 1, which heels form extensions of the rib $w$ and enter grooves on the inner sides of the opposite ends of the adjacent sections $f$, so that the pressure in chambers $c$, acting upon the inner faces of the ribs $w$ of keepers $g$, press these heels 1 outward against the inner surface of the grooves in the sections $f$, and thus maintain a tight joint, so that the liquid cannot pass from these chambers between the sections and keepers as the latter move from each other circumferentially of the piston in the expansion of the rim. Each of the sections $f$ is also provided with a wide tongue 2, which enters a groove in the outer face of the adjacent keeper $g$, these tongues carrying the grooves $e$, so that the two tongues 2 of sections on opposite sides of a keeper $g$ lap over the face of the keeper and form an approximately continuous groove $e$, the pressure of the liquid in the grooves $e$ on the outer faces of the tongues 2 thus pressing these tongues into contact with the outer faces of the grooves in the keepers $g$, in which the tongues move, to maintain a tight joint between these surfaces, so that the liquid from groove $e$ cannot pass between them when the tongues 2 separate in expanding the ring.

It will be seen that my piston construction provides for the application of water or other lubricating liquid in a very advantageous manner and that I at the same time provide for securing a uniform and readily-controllable pressure upon an expansible piston ring or rings. This uniformity and controllability of the pressure is very important, not only in connection with securing the desired piston-ring pressure, but also in connection with lubricating, as it enables just the desired lubricating action to be secured without danger of escape of steam or the undesirable passage of the lubricating liquid to the cylinder.

One of the important advantages of my construction, from the lubricating standpoint, is that the steam-pressure on the side from which the piston is moving prevents the escape of the liquid on that side, while the lower exhaust-pressure on the side toward which the piston is moving permits the liquid to escape a little on that side, and thus keep the cylinder constantly wet in advance of its travel.

The central groove $e$ is formed in a stationary non-expansible ring $h$ and is used for the purpose of balancing the piston—that is, of exerting a lifting-pressure upon the piston sufficient to balance the weight of the piston—and thus prevent the lower surface of the piston bearing upon and wearing away the inner surface of the bottom of the cylinder. For this purpose the groove $e$ is made differential—that is, varying in size—so as to secure the effective lifting-pressure desired, being shown as wider in the lower part of the piston than in the upper, the wider portion of the groove $e$ being formed, as shown in Fig. 5, by cutting away the walls of the ring $h$ which form the groove, so as to enlarge the groove to the extent desired, as shown at 9. The result may be secured in a manner which will probably be found preferable by allowing the liquid to act upon the full face of the ring $h$ between the two rings formed by the sections $f$ and keepers $g$, but cutting away the face of the ring $h$ in the upper part of the piston on opposite sides and widening the sections and keepers forming the two expansible rings on their inner sides, so as to overlap upon the cut-away portions of the ring $h$. In this modified construction the ring $h$ will be its full with the hot-well K through pipe 16, these pipes 15 16 being controlled by valves 10, so that the suction of the pump P may be taken from either the tank Q or the hot-well K. The force-pipe 17 of this pump P connects through a pipe 18 and stationary bearing 19 with a link-pipe 20, and thus through swinging pipe 21 to the fluid-passage a of the hollow piston-rod C, all the joints of these pipe connections being of any common or suitable form, so as to permit the movement of the pipes without leakage, the joint between pipe 21 and the piston-rod being shown in Fig. 7 and the fluid from the force-chamber of pump P thus being forced into the piston, where it is utilized in a manner presently to be described.

Figures 2, 3, 4:
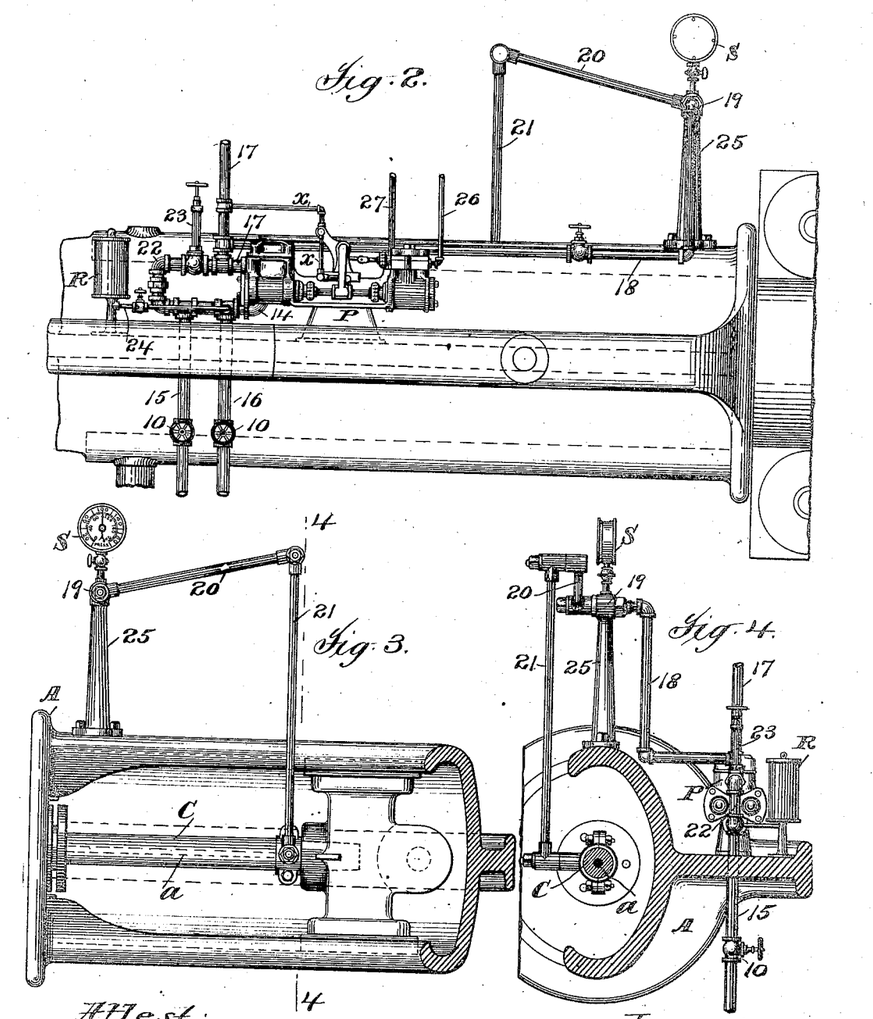
Fig. 2 is a side elevation of a portion of the main engine with the lubricating-pump mounted thereon and showing the lubricating-liquid connections.
Fig. 3 is a similar view of a portion of the main engine looking from the opposite side.
Fig. 4 is a vertical cross-section on the line 4 of Fig. 3.

The suction-pipe 14 and force-pipe 17 of the pump P are connected by a pipe 22, as shown in Fig. 2, upon which is placed an adjustable relief-valve 23, which may be set at any required pressure, so that just the desired pressure may be kept upon the force-pipe 17 and the water in the piston B, the water circulating at this pressure between the force and suction of the pump, when the valves 10 in pipes 15 16 are nearly closed, it being necessary only to admit a little water to the suction of the pump through either pipe 15 or pipe 16 to supply the small waste of water which is forced through on the advance side of the piston-rings. An oil-tank R is provided, which is connected with the suction-pipe 14 by a small pipe 24, controlled by a cock, so that oil may be admitted to the suction-pipe in such quantity as desired—as in starting a new engine—and cut off at will. A pressure-gage S is mounted on the standard 25, which supports the joint 19, and connected to the water-space in said joint, so that the pressure of the liquid in the piston is always in view of the engineer, and by adjustment of the relief-valve 23 the desired reading of the pressure-gage may be secured. Steam is admitted to the steam end of pump P through induction-pipe 26 and exhausted through exhaust-pipe 27, which exhaust-pipe 27 connects with exhaust-pipe 13 of pump M, so that the exhaust from pump P passes with the exhaust from pump M to the heater with the main exhaust. The drip from main exhaust-pipe D passes through pipe 28 to the tank Q, and this pipe 28 receives also the drip from exhaust-pipes 13 and 27 through drip-pipe 29.

The overflow from tank Q passes through pipe 30, which connects with the tank near its bottom to steam-trap tank T, and the drip from the Berriman heater E passes to pipe 30 through pipe 31. The tank T is provided with a float 32 and float-lever 33, which lever connects, through link 34, with a valve on steam-pipe 35, so that when the tank is filled to the level for which the parts are adjusted the valve is opened and steam admitted through pipe 35 above the water in the tank T and the water in the tank thus forced through pipe 36 to the hot-well K. When the water has been removed, so that the float has fallen to the desired point, the steam-valve is closed and the steam cut off for the next filling of the tank T. A drain-pipe 37 connects the tank Q with the sewer O, and the tank T is connected with this pipe 37 by a drain-pipe 38, so that the tanks Q T may be emptied and cleansed as desired.

Referring now to the steam-piston B and the application of the liquid therein for cylinder lubrication and balancing the piston, the liquid passage a, previously described and with which the force-pipe 17 of the pump P connects for maintaining the desired liquid-pressure, is closed at the outer side of the piston by a screw-plug 39 and is connected by passages b, extending outward from the piston center, with annular liquid-chambers c, extending about the piston, and which liquid-chambers are connected by small liquid-passages d with annular grooves e in the circumference of the piston, in which grooves the liquid comes in contact with the inner surface of the cylinder, so as to lubricate the latter. As shown in Fig. 5, there are two of these annular liquid-chambers c and three grooves e, and each of these grooves is supplied from the passage a by a passage or passages b, one or more passages for each liquid-chamber being used as desired, and each of the chambers c is connected with the corresponding groove e by one or more passages d, as may be found desirable.

The two outer grooves e of those shown in Fig. 5 are formed in the sections of expansible piston-rings which form that portion of the periphery of the piston which comes in contact with the cylinder and which form the outer wall of chambers c, the pressure upon these sections forcing them out into contact with the inner surface of the cylinder being secured by the excess of liquid-pressure upon the inner side of these sections, which are made differential to secure this result, the extent of inner surface being properly proportioned to the outer surface, the effective outward pressure on the ring obviously being dependent upon the surface on the inner faces of the sections acted upon by the outward pressure in chambers c, as compared with the surface of the grooves e, in which the pressure of the liquid tends to force the sections inward. It will be seen that by calculating in the construction of the piston the inner and outer differential areas of the piston-rings—that is, the width of the chambers c relatively to the width of the grooves e—the piston may be constructed so as to secure just the required outward pressure upon the expansible piston-rings for a certain liquid-pressure in passage a, and just the required pressure in this passage to secure the result desired may width in the lower part of the piston and its width in the upper part of the piston be reduced, so as to secure just the balancing or lifting pressure required by cutting away more or less of the ring on opposite sides and correspondingly widening the sections and keepers of the other rings in the upper part of the piston. In either of these constructions— that is, with the pressure-surface increased in the lower part of the piston or decreased in the upper part of the piston for balancing—it will be seen that the exact balancing or lifting effect on the piston may readily be secured by calculating the required relative sizes of these differential pressure-surfaces in accordance with the weight of the piston and the pressure of the fluid in the piston and constructing the piston accordingly. As previously described in connection with the expansible rings, just the pressure desired for balancing the piston may readily be secured and maintained by the action of the pump P and the adjustment of the relief-valve 23. The ring h may be an expansible ring formed in the same manner as the other two rings; but preferably it is a continuous non-expansible ring. It will be understood that this piston-balancing feature is applicable only to horizontal pistons, although the lubricating and piston-ring features are applicable also to vertical pistons.

The operation of the system thus far described will be readily understood from the drawings and the above description, it being explained that oil may be introduced to suction-pipe 14 of pump P from tank R as desired, as in starting a new engine, supply-pipe 15 from tank Q being then used for the supply of lubricating liquid, this tank receiving the drip from the exhaust-steam with such oil as it may contain. It will be seen that the supply-pipe 15 takes the water from the top of tank Q, where the oil collects, and that pipe 30 to tank T connects with the lower part of the tank Q, so as to deliver to tank T water from which the oil has been largely removed by rising to the surface in tank Q. When desired, as when the engine has attained its normal running condition, the oil-feed may be cut off, feed-water introduced to pump P and the piston from the hot-well through supply-pipe 16, and the pump P run with the feed-water, pipe 16 being cut off, valve 23 opened, and the pump P run on the circulating connections 22 when the desired pressure is attained, when the setting of valve 23 determines the pressure maintained in the piston, or the tank Q may be cleaned out and used with non-oily water, as the supply of pump P through pipe 15.

The pump P is of so small size that my lubricating means need not be applied thereto, but pipe connections x from force-pipe 17 to the hollow piston-rod are shown in Fig. 2, so that the piston of pump P may be lubricated in the same manner as piston B and from the same pressure-supply.

It is not essential that the special lubricating-pump P be used, but the liquid may be supplied to the piston B under the pressure required in any other suitable manner within the invention, considered broadly. In the system illustrated in Fig. 1 I have shown a pipe y from the boiler-feed pipe X, connecting to the lubricating system through pipe 17, so that if desired for any reason the pump P may be cut off and the cock on pipe y being opened the lubricating system be supplied with liquid from pipe X under the pressure of the feed-pump M. It is possible also to secure the required pressure in the lubricating system by taking the water directly from the water in the boilers through suitable piping, which should preferably be provided with devices for adjusting the pressure. I have not shown the liquid as used in the stuffing-boxes for lubricating the piston-rod of engine A or the piston or plunger rods of pump M or pump P, but it will be understood that liquid under the desired pressure may readily be supplied to these stuffing-boxes, being most conveniently taken from pipe 18. It will be understood that liquid may be supplied to the pipe P through pipe 17 to any desired number of engines in the same manner as to the piston of engine A, and pipe 17 is shown in Figs. 2 and 4 as extended above pipe x and broken, as though extending to other engines.

The piston-lubricating construction of the feed-pump M is shown in Figs. 9 to 16 and will now be described. The piston-balancing feature is omitted in connection with this pump, as it is unnecessary on account of its small size. The pump is shown as of a common type of duplex pump; but it will be understood that the same construction may be applied to pumps of other form. The pump M has the steam-cylinders m and the pump-cylinders n, in which move, respectively, the steam-piston U and pump-plunger V, which piston and plunger are connected directly by the rod o, through which extends the water-passage a'. This water-passage a' connects by passage b' with the annular water-chamber c', from which the water passes through one or more passages d' to the annular water-groove e' on the outer face of the sections f' and keepers g', which form the expansible ring of the piston, and the water-passage a' communicates at the outer side of the plunger with the water-space in cylinder n through a valve 41, mounted in a cap 42 on the end of the rod o and seated by spring 43 against valve-seat 44 in the cap, so as to normally close under spring-pressure the connection of the water-passage a' with the water-space in cylinder n; but this connection opens by the movement of the valve 41 against spring 43 as the piston and plunger V move to the right in Fig. 9. The sections $f'$ and keepers $g'$ of the piston U are modified in form from those of the piston B, previously described, the form shown in connection with piston U being well adapted for use with small pistons. The sections $f'$ and keepers $g'$ of the piston U are formed with the lubricating-groove $e'$ on their outer faces and with small grooves or annular notches 3 on opposite sides of the groove $e'$, which aid in preventing the escape of liquid into the cylinder or leakage of steam. Each of the sections $f'$ carries at opposite ends a central tongue 4 on opposite sides of the rib $w$, and the keepers $g'$ are grooved at opposite ends and on opposite sides of the ribs $w$ to receive these tongues, the tongues 4 fitting tightly in the grooves in the keepers $g'$, so as to form tight joints between the inner and outer surfaces of the tongues and grooves, thus preventing the passage of water when the sections and keepers are separated in the expanded ring. The inner and outer surfaces of the tongues and grooves are shown as plane surfaces and not curved concentrically with the piston, so that the sections and keepers may move toward and from each other, while maintaining extended surfaces in contact for forming the water-tight joints. The expansible ring of the piston U is shown as provided with coiled springs 45 in place of the flat springs 40 of the piston B, these coiled springs pressing against the inner side of the sections $f'$ and serving to hold the sections and keepers in position when the pressure does not act for that purpose, these coiled springs 45 being of sufficient strength to maintain the desired pressure on the movement of the piston U when the water-pressure is not applied, as is necessary in case the piston U moves to the left on its first stroke in starting the pump. The action of this construction will be readily understood from the drawings and a brief description.

Assuming that the piston U and plunger V are moving to the right in Fig. 9, the pressure in advance of the plunger—that is, the force-pressure of the pump—opens the valve 41, and thus the water under this pressure passes through the passages $a'$ $b'$ $d'$ to the groove $e'$, and thus is applied under the force-pressure for lubricating the cylinder. Upon the return stroke of the piston and plunger in the opposite direction the valve 41 is moved by the spring 43, and the pressure in the piston acts against the suction-pressure in the pump-chamber, so as to close the connection between the passage $a'$ and the pump-chamber behind the plunger, and thus the water is retained in the piston-rod, piston, and groove $e'$. The loss of pressure in the liquid in the piston is compensated for by springs 45. If a connection between passage $a'$ and the side of the plunger V opposite valve 41 be made and controlled by a similar valve opening in the opposite direction, the required liquid-pressure in the piston U will be maintained on both strokes of the piston, and the springs 45 may be omitted or light springs substituted. It will be seen that in this construction the pressure of the water in the piston and in groove $e'$ is directly dependent upon the force-pressure in the pump, and thus varies according to the steam-pressure, which is a desirable feature of this construction. The desired pressure of the water or other liquid in the piston may be secured by many different means, and I have shown in Figs. 17 to 26 some of the many forms of construction that may be used for this purpose.

In Figs. 17 to 21 I have shown a construction in which the liquid is not introduced into the piston through the piston-rod, but through a separate pipe $i$, in which is a water-passage $a^2$, corresponding to the water-passage $a$ of the piston B, the piston shown in these figures being otherwise the same in construction as the piston U of the pump M and as above described in connection with Figs. 9 to 16, so that the same reference-letter may be applied to it. This pipe $i$ is shown as opening directly into the annular chamber $e'$ and rigidly secured to the piston U, so as to move therewith. This pipe $i$ must be connected with the water-supply by some form of flexible connection, for which an ordinary flexible pipe may be used; but for compactness and convenience I preferably use and have shown this pipe as connected to the water-supply by a lazy-tongs $k$, one arm of which consists of water-pipe sections connected by tight joints, and the pipe $i$ is thus connected to the liquid-supply pipe $l$, which may be fed by the pump P, as in the construction previously described, or from any suitable liquid-supply under the desired pressure. A gage S is shown as connected to the supply-pipe $l$ by a short pipe 46. The pressure in the piston V is thus known to the engineer, so that it may be adjusted as required.

Figures 22, 23, 24, 25:
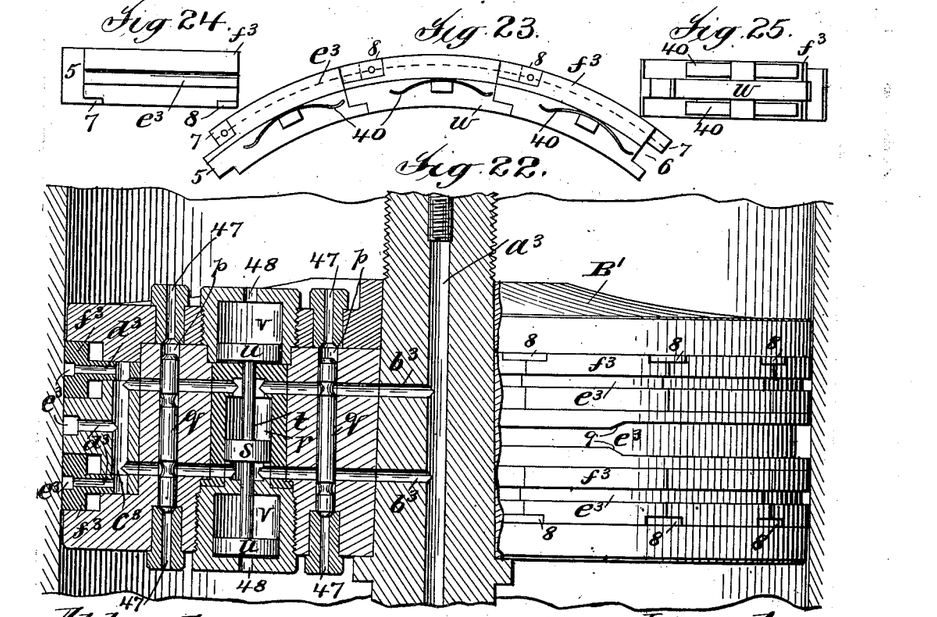
Fig. 22 is a vertical section through a steam-cylinder, with half the piston in elevation and the other half in central vertical section, showing a modified construction of piston and means for applying the liquid for lubricating and balancing.
Fig. 23 is a side view of a portion of the movable sections of the piston-rings.
Fig. 24 is a detail view looking down on one of the sections of Fig. 23.
Fig. 25 is a detail view of the under side of one of the sections in Fig. 23.

In Figs. 22 to 26 I have shown two constructions in which the pressure of the liquid in the piston is secured by a pump operated directly by the steam in the steam-cylinder, so that the pressure of the liquid in the piston is directly dependent upon and varies with the steam-pressure, which is very desirable, as assuring exactly the required pressure for lubrication without the escape of the liquid into the cylinder. In the construction shown in Figs. 22 to 25 the pump is placed within the piston itself, the piston otherwise being of the general construction of the piston B, (shown in Fig. 5,) except that the construction of the expansible rings is modified. In this piston B' the water-passage $a^3$ is in the piston-rod, as in the case of the water-passage $a$ in piston B, and this water-passage $a^3$ connects by two water-passages $b^3$ with an annular water-chamber $c^3$, which extends over and feeds all the three series of passages $d^3$, through which the grooves $e^3$ for lubricating and balancing are fed. Intersecting the two passages $b^3$ are two cross passages or chambers $p$, containing the piston-valves $q$, these chambers $p$ running through the piston, so that the steam in the cylinder on the opposite side of the piston B' acts upon the opposite ends of these piston-valves $q$, these chambers preferably not opening full size to the cylinder, but being connected therewith by short passages 47 of reduced diameter, so as to secure a cushioning effect and avoid slamming of the valves $q$. Between the two piston-valves $q$, within the piston B' and intersecting the two liquid-passages $b^3$ is the pump-chamber $r$, in which moves the plunger $s$, carried by rod $t$, on opposite ends of which are the steam-pistons $u$, moving in steam-chambers $v$ in the piston B', which steam-chambers run into the steam-cylinder on opposite sides of the piston through small passages 48, these small passages securing the cushioning of the pistons $u$ in their movement with the plunger $s$. The operation of this pumping device is as follows: As shown in Fig. 22, the piston B' is moving to the right, the piston-valves $q$ have been moved by the steam-pressure in front of the piston to the left in Fig. 22, and the piston $u$ with the plunger $s$ moved in the same direction by the same pressure, so that liquid has been drawn from the liquid-passage $a^3$ into the chamber $r$ behind the plunger $s$ through the passage $b^3$ at the right in Fig. 22 and the liquid in chamber $r$ in front of the plunger $s$ has been forced through the passage $b^3$ at the left hand of Fig. 22 into the chamber $e^3$, the other sections of the passages $b^3$ communicating, respectively, with the passage $a^3$, and the chamber $c^3$ being closed by the piston-valves $q$. On the change of the steam-pressure in the steam-cylinder for the reversal of the piston B' the piston-valves $q$ and the pistons $u$ with the pump-plunger $s$ are thrown in the opposite direction, and thus liquid is drawn into the pump-chamber $r$ through the section of the left-hand passage $b^3$ communicating with the chamber $a^3$, and liquid is forced into the annular chamber $c^3$ through the section of the right-hand passage $b^3$, communicating with chamber $c^3$, the other sections of the passages $b^3$ being closed by the piston-valves $q$. Thus the required pressure in annular chamber $c^3$ and in the grooves $e^3$ is maintained, and this pressure is directly dependent upon the pressure of steam in the cylinder.

The form of the sections $f^3$ of the piston B' is illustrated in detail in Figs. 23 to 25, these sections being all of the same size and form instead of using long sections and short keepers, as in the constructions previously described. In this construction each of the sections $f^3$, having the groove $e^3$ on their outer faces, is provided at one end with a tongue 5 and at the opposite end with a notch 6, these tongues and notches being arranged so as to secure extended surfaces in contact as the sections move from each other in expanding the ring, so as to assure the prevention of liquid passing between these surfaces. Each of the sections is provided also at each end with a notch 7 at the top of the section on the side next the steam, and a piece 8 is fitted into the notch of one section and pinned thereto, so as to move with the section, and this piece lies in the notch 7 of the adjacent section, so as to lap over and cover the joint between the sections, and thus prevent the steam crossing over the ring through these joints when the sections separate in expanding the rings. If only one ring be used, these notches 7 and pieces 8 will be used on each side of the ring. Flat springs 40, which are divided, as in the case of the springs shown in Figs. 5 and 6, so as to apply outward pressure to the sections on opposite sides of the inwardly-extending rib $w$ on the sections against which the pressure of the liquid in chamber $e^3$ acts, are used, these springs performing the same function as the springs 40 of the construction shown in Figs. 5 and 6 in holding the sections in position under light pressure when the liquid-pressure is removed.

Figure 26:
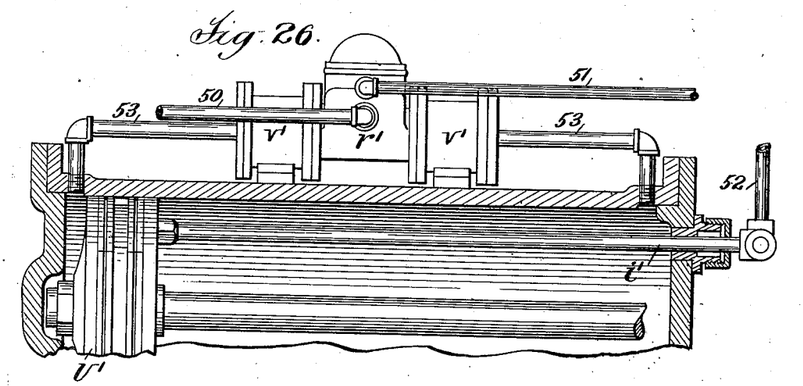
Fig. 26 is a central section of a steam-cylinder with the piston in elevation, showing another means for supplying the fluid for lubricating and balancing.

In Fig. 26 I have shown a construction similar in operation to that shown in Fig. 22 and in which the liquid-pressure is directly dependent upon the steam-pressure; but this steam-pressure is applied in actuating a pump placed outside the cylinder instead of within the piston, as in the construction shown in Fig. 22. In this construction (shown in Fig. 26) the steam-chambers $v'$ and pump-chamber $r'$, corresponding to the chambers $v$ $r$ of Fig. 22, are mounted upon the top of the cylinder and the pump-chamber $r$ connected by suction-pipe 50 to a suitable liquid-supply and by force-pipe 51 and suitable flexible connections (not shown) to pipe 52, which connects with pipe $i'$, which is connected to the piston U' in the same manner as shown in Figs. 17 to 21, the piston U' being shown also as of the same construction as piston U. The outer ends of the steam-cylinders $v'$ are connected by pipes 53 with the opposite ends of the steam-cylinder, so that the pistons in cylinders $v'$ are subjected alternately to the pressure on the induction and exhaust sides of the piston U'. The operation of this construction is the same as of that shown in Fig. 22, the steam-pistons in cylinders $v'$ being actuated so as to move the pump-plunger in opposite directions by the induction and exhaust pressures of the steam-cylinder applied alternately to these pistons through the pipes 53 and the pressure of the liquid in the piston U' being maintained by the action of the pump-plunger in pump-chamber r' moved by these pistons, it being understood that any suitable form of voluntary valves may be used in this pump.

It will be understood that the broad features of my invention may be embodied in other constructions than those illustrated and that many modifications may be made in the constructions shown by those skilled in the art while employing not only the broader but more specific features of my invention, and I am not to be limited to the exact construction or arrangement of parts illustrated for carrying out my invention.

What I claim is—

1. In a steam-engine system in which the exhaust-steam from the engine is condensed and the condense-water fed to the boilers, the combination with the engine-piston having one or more annular grooves in its periphery, of means for forcing liquid into said groove or grooves through the piston and maintaining said liquid in said groove or grooves under pressure, a drip-tank receiving the drip from the exhaust-steam connections, a tank receiving the overflow from the drip-tank and connected to the boiler-feed supply, and connections controlled by a float for admitting steam to said second tank to secure the feed of the water in said tank to the boiler-feed supply when the water in the tank reaches a certain level, substantially as described.

2. In a steam-engine system in which the exhaust-steam from the engine is condensed and the condense-water fed to the boilers, the combination with the engine-piston having one or more annular grooves in its periphery, of a pump and suitable connections for forcing liquid into said groove or grooves and maintaining said liquid in said groove or grooves under pressure, a drip-tank receiving the drip from the exhaust-steam connections, a tank receiving the overflow from the drip-tank and connected to the boiler-feed supply, connections controlled by a float for admitting steam to said tank to secure the feed of the water in said tank to the boiler-feed supply when the water in the tank reaches a certain level, and connections to the suction of said pump for supplying said pump from the drip-tank, substantially as described.

3. In a steam-engine system in which the exhaust-steam from the engine is condensed and the condense-water fed to the boilers, the combination with the engine-piston having one or more annular grooves in its periphery, of a pump and suitable connections for forcing liquid into said groove or grooves and maintaining said liquid in said groove or grooves under pressure, a drip-tank receiving the drip from the exhaust-steam connections, a tank receiving the overflow from the drip-tank and connected to the boiler-feed supply, connections controlled by a float for admitting steam to said tank to secure the feed of the water in said tank to the boiler-feed supply when the water in the tank reaches a certain level, and connections to the suction of said pump for supplying said pump from the drip-tank or from the boiler-feed supply, substantially as described.

4. In a steam-engine system in which the exhaust-steam from the engine is condensed and the condense-water fed to the boilers, the combination with the engine-piston having one or more annular grooves in its periphery, of a pump and suitable connections for forcing liquid through the piston into said groove or grooves, connections between the suction and force sides of said pump for circulating the liquid to maintain the pressure in said groove or grooves, and an adjustable valve on said circulating connections for regulating the pressure in the piston, substantially as described.

5. The combination with an engine-piston having one or more annular grooves in its periphery, of a pump and suitable connections for forcing liquid into said piston and maintaining liquid under pressure in said groove or grooves, means for cutting off the supply from said pump, and connections between the suction and force sides of said pump for circulating the liquid for maintaining the pressure, substantially as described.

6. The combination with an engine-piston having one or more annular grooves in its periphery, of a pump and suitable connections for forcing liquid into said piston and maintaining liquid under pressure in said groove or grooves, connections between the suction and force sides of said pump for circulating the liquid for maintaining the pressure in the piston, and an adjustable valve on said circulating connections for adjusting the pressure in the piston, substantially as described.

7. The combination with an engine-piston having one or more annular grooves in its periphery, of a pump having force-pipe 17, suitable connections between said force-pipe and piston, suction-pipe 14, circulating-pipe 22 connecting said pipes 14, 17, supply-pipe 16, and means for closing and opening said supply-pipe and circulating connections, substantially as described.

8. The combination with an engine-piston having one or more annular grooves in its periphery, of a pump having force-pipe 17, suitable connections between said force-pipe and piston, suction-pipe 14, circulating-pipe 22 connecting said pipes 14, 17, supply-pipe 16 and means for closing and opening said supply-pipe, and adjustable valve 23 on the circulating connections, substantially as described.

9. The combination with an engine-piston having one or more annular grooves in its periphery, of a pump having force-pipe 17, suitable connections between said force-pipe and piston, suction-pipe 14 and circulating-pipe 22 connecting said pipes 14, 17, supply-pipes 15, 16, and means for closing either or both of said supply-pipes, substantially as described.

10. The combination with an engine-piston having one or more expansible piston-rings provided with annular grooves in their periphery, of an annular liquid-chamber within the piston the outer wall of which is formed by said ring or rings, liquid-passages between said liquid-chamber and said grooves, the total outward pressure on the inner side of the expansible ring or rings from the liquid-chamber being in excess of the total inward pressure on the ring or rings from the liquid-grooves, and springs pressing outward upon said expansible ring or rings, substantially as described.

11. The combination with an engine-piston having one or more expansible piston-rings provided with annular grooves in their periphery, of a liquid-chamber within the piston the outer wall of which is formed by said ring or rings, liquid-passages between said liquid-chamber and said grooves, the total outward pressure on the inner side of the expansible ring or rings from the liquid-chamber being in excess of the total inward pressure on the ring or rings from the liquid-grooves, and means for maintaining liquid in said chamber and grooves under adjustable pressure, substantially as described.

12. The combination with a horizontal engine-piston having an annular liquid-space wider in the lower part of the piston than in the upper part and two expansible piston-rings on opposite sides of said water-space provided with annular grooves, of a liquid chamber or chambers within the piston, the liquid in which acts against the inner sides of the expansible rings, liquid-passages between said liquid-chamber and the grooves and liquid-space, said expansible rings being formed to expose a larger surface to the outward pressure in the liquid-chamber than to the inward pressure in the grooves, and connections between said liquid chamber or chambers and a source of liquid-supply under pressure, substantially as described.

13. A piston having an expansible ring formed of sections provided with inwardly-extending ribs $w$ of less width than the face of the ring, a liquid-groove in the periphery of the ring, and a liquid-chamber the outer wall of which is formed by said ribs, substantially as described.

14. A piston having an expansible ring formed of sections provided with inwardly-extending ribs $w$, a liquid-groove in the periphery of the ring, a liquid-chamber the outer wall of which is formed by said ribs, and divided springs 40 on opposite sides of said ribs, substantially as described.

15. A piston having an expansible ring formed of sections provided with inwardly-extending ribs $w$ of less width than the face of the ring, a liquid-groove in the periphery of the ring, a liquid-chamber the outer wall of which is formed by said ribs, and one or more passages connecting the liquid chamber and groove, substantially as described.

16. A piston-ring formed of sections $f$ and keepers $g$ having liquid-groove $e$, heels 1 on the keepers engaging the inner surfaces on the sections, and tongues 2 on the sections entering grooves in the keepers, substantially as described.

17. A piston-ring formed of sections $f$ and keepers $g$ having liquid-groove $e$, heels 1 on the keepers engaging the inner surfaces on the sections and tongues 2 on the sections entering grooves in the keepers, and inwardly-projecting ribs $w$ on the sections and keepers, substantially as described.

18. A piston-ring formed of sections $f$ and keepers $g$ having liquid-groove $e$, heels 1 on the keepers engaging the inner surfaces on the sections and tongues 2 on the sections entering grooves in the keepers, inwardly-projecting ribs $w$ on the sections and keepers, and divided springs 40 on opposite sides of the ribs $w$, substantially as described.

19. In a direct-acting pump, the combination with the piston and plunger, of a rod having a water-passage therein opening to the water-space in the pump-cylinder, a water-groove in the periphery of the piston, and a water-passage through the piston connecting said groove with the passage in the rod, whereby water is forced into said groove under pressure by movement of the piston and plunger, substantially as described.

20. In a direct-acting pump the combination with the piston and plunger, of a rod having a water-passage therein opening to the water-space in the pump-cylinder, a water-groove in the periphery of the piston, a water-passage through the piston connecting said groove with the passage in the rod, and a valve opening to force liquid through the passage in the rod as the plunger moves in one direction and acting to close said passage on the return stroke, whereby water is forced into said groove under pressure by the movement of the piston and plunger, substantially as described.

21. The combination with piston U, and plunger B having connecting-rod O provided with water-passage $a'$, of annular water-chamber $c'$ in the piston, passage $b'$ connecting passage $a'$ and the water-chamber, an expansible ring the inner side of which forms the outer wall of the water-chamber $c'$ and having a water-groove in its periphery, the surfaces of said ring acted on by the outward pressure in water-chamber $c'$ being greater than that acted on by the inward pressure in groove $e'$, substantially as described.

22. The combination with piston U and plunger B having connecting-rod O provided with water-passage $a'$, of annular water-chamber $c'$ in the piston, passage $b'$ connecting passage $a'$ and the water-chamber, an expansible ring the inner side of which forms the outer wall of the water-chamber $c'$ and having a water-groove in its periphery, the surface of said ring acted on by the outward pressure in water-chamber $c'$ being greater than that acted on by the inward pressure in groove $e'$, and a spring-pressed valve 41 opening to admit liquid under force pressure to the passage $a'$ and closing on the return stroke, substantially as described.

23. The combination with piston U and plunger B having connecting-rod O provided with water-passage $a'$, of annular water-chamber $c'$ in the piston, passage $b'$ connecting passage $a'$ and the water-chamber, an expansible ring the inner side of which forms the outer wall of the water-chamber $c'$ and having a water-groove in its periphery, the surfaces of said ring acted on by the outward pressure in water-chamber $c'$ being greater than that acted on by the inward pressure in groove $e'$, and springs pressing said expansible ring outward, substantially as described.

In testimony whereof I have hereunto set my hand in the presence of two subscribing witnesses.

DANIEL M. SOMERS.

Witnesses:
C. J. SAWYER,
A. A. V. BOURKE.